(12) United States Patent
Dondurur et al.

(10) Patent No.: US 8,850,966 B2
(45) Date of Patent: Oct. 7, 2014

(54) FOOD RETAINER FOR ROTARY GRILL

(75) Inventors: Mehmet Dondurur, Dhahran (SA); Ahmet Z. Sahin, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 115 days.

(21) Appl. No.: 13/028,071

(22) Filed: Feb. 15, 2011

(65) Prior Publication Data

US 2012/0204732 A1    Aug. 16, 2012

(51) Int. Cl.
*F24C 15/16*    (2006.01)
*A23C 1/00*    (2006.01)
*A47J 37/04*    (2006.01)

(52) U.S. Cl.
CPC .................................. *A47J 37/041* (2013.01)
USPC ........................................ 99/427; 99/421 P (58) Field of Classification Search
USPC ........... 99/427, 390–399, 477–479, 501–505, 99/450, 421 P; 219/388
See application file for complete search history.

(56) References Cited

U.S. PATENT DOCUMENTS

| | | | |
|---|---|---|---|
| 3,147,690 A | 9/1964 | Smith | |
| 4,421,017 A | 12/1983 | Ross | |
| 4,555,986 A | 12/1985 | Eisenberg | |
| 5,619,909 A | 4/1997 | Volk | |
| 5,761,991 A | 6/1998 | Kambies | |
| 6,330,854 B1 * | 12/2001 | Waltman | 99/427 |
| 6,343,544 B1 * | 2/2002 | Bellion | 99/421 H |
| 6,439,109 B1 | 8/2002 | Rehill | |
| 6,465,760 B1 | 10/2002 | Wong | |
| 6,509,549 B1 | 1/2003 | Chasen et al. | |
| 6,561,083 B2 * | 5/2003 | Hsu | 99/421 H |
| 6,658,991 B2 | 12/2003 | Backus | |
| 2001/0032639 A1 | 10/2001 | Leach | |
| 2005/0092188 A1 | 5/2005 | Huegerich et al. | |
| 2005/0279342 A1 * | 12/2005 | Bott | 126/21 A |
| 2006/0150827 A1 * | 7/2006 | Bruno et al. | 99/450 |
| 2008/0083401 A1 * | 4/2008 | Cusack | 126/25 R |
| 2009/0277339 A1 * | 11/2009 | Andrade | 99/427 |
| 2010/0263654 A1 * | 10/2010 | Cusack | 126/25 R |

FOREIGN PATENT DOCUMENTS

WO    WO2010053538 A1    5/2010

* cited by examiner

*Primary Examiner* — Tu B Hoang
*Assistant Examiner* — Michael Laflame, Jr.
(74) *Attorney, Agent, or Firm* — Richard C. Litman (57) ABSTRACT

The food retainer for a rotary grill allows a wide variety of differing food articles to be grilled with a rotary grill, a rotisserie or the like. The food retainer may take the form of a flat rectangular wire mesh cage having an open side edge for inserting a slice or patty of food therein; a perforate plate or a wire rack having one or more straps for securing food thereto; a wire mesh cylindrical shell having an open end for inserting food therein; or circular end members having radially spaced spits or skewers extending between them. All embodiments of the food retainer have shaft ends extending therefrom for rotatably mounting the food retainers on a rotary grill or rotisserie.

5 Claims, 8 Drawing Sheets

*FIG. 8*
*PRIOR ART*

FOOD RETAINER FOR ROTARY GRILL

BACKGROUND OF THE INVENTION

1. Field of the Invention

The present invention relates generally to cooking appliances, and particularly to a food retainer for a rotary grill that provides a retainer for mounting food articles within the rotary grill.

2. Description of the Related Art

Figure 7:
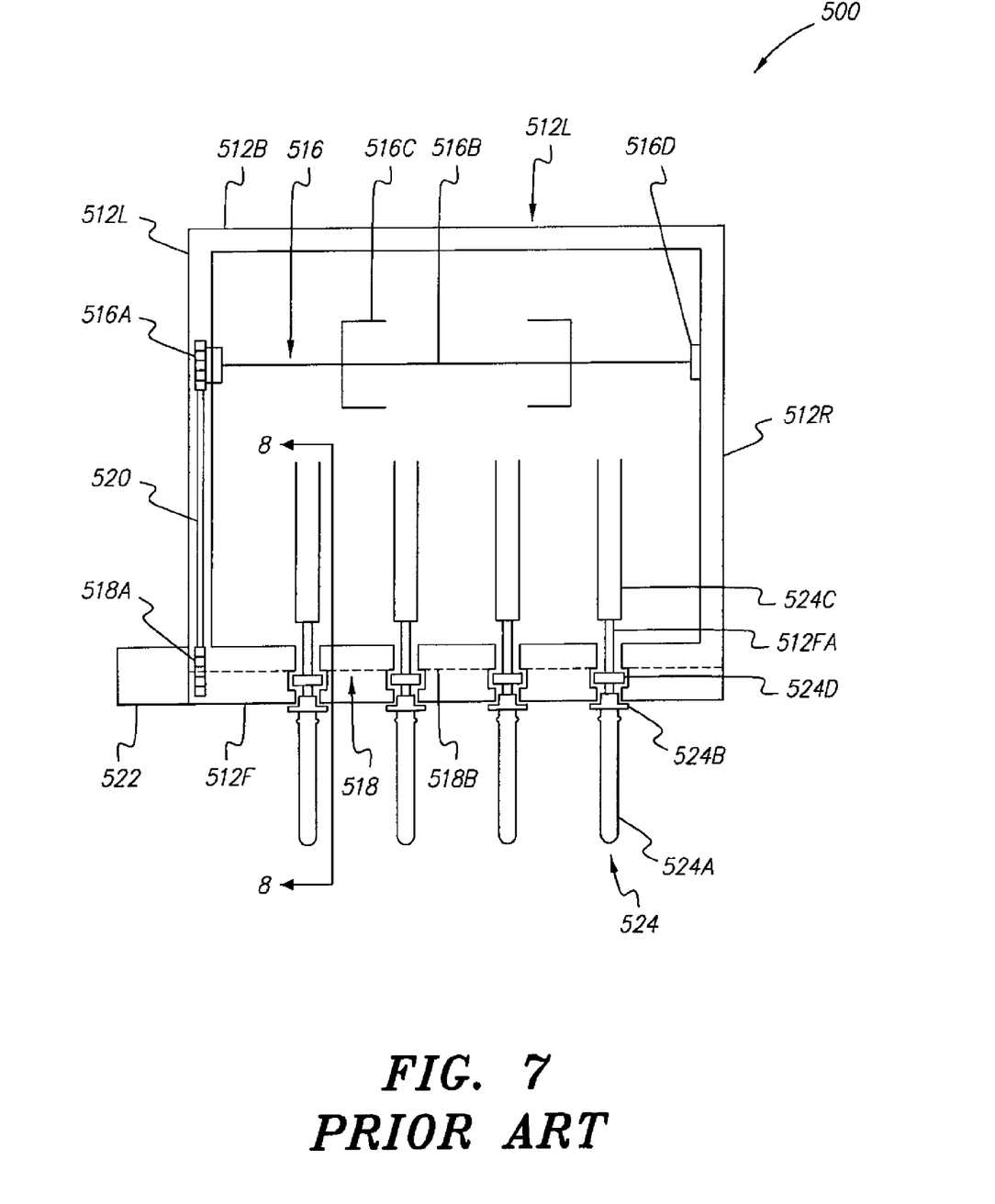
FIG. 7 is a diagrammatic top view of a rotary grill according to the prior art.
Figure 8:
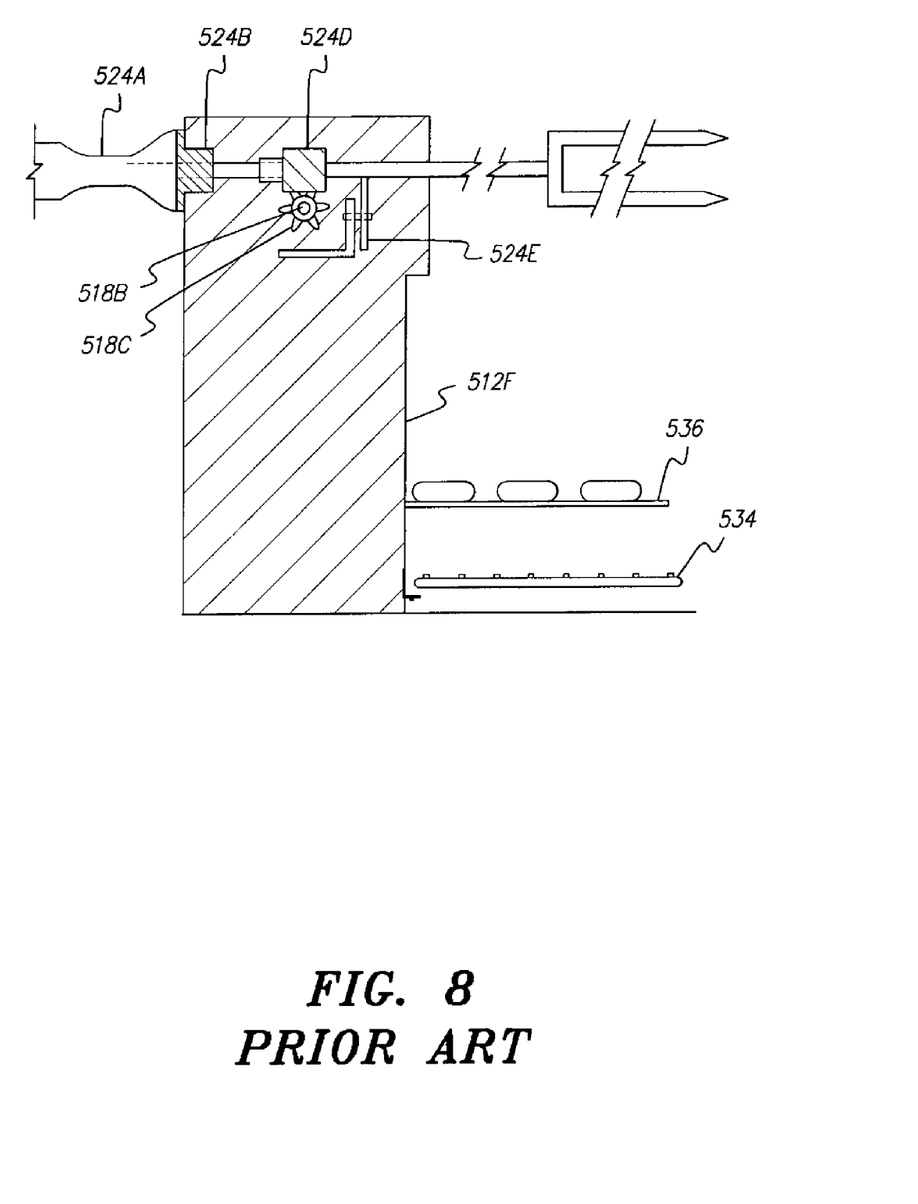
FIG. 8 is a section view taken along lines 8-8 of FIG. 7.

Rotary grills are known in the art. FIGS. 7 and 8 illustrate an exemplary prior art rotary grill 500. The rotary grill 500 includes a kettle-type housing, which may be adapted for electric, wood or charcoal grilling. The housing has a kettle front 512F having at least one kettle front holder 512FA mounted therein. In the orientation of FIG. 7, the kettle housing also includes a kettle back 512B, a kettle left side 512L, and a kettle right side 512R.

The rotary grill 500 further includes at least one drive 518 positioned in the kettle. The at least one drive 518 includes a drive shaft 518B having a drive sprocket 518A securely attached at a distal end thereof. The rotary grill 500 further includes a motor 522, which is connected to the drive shaft 518B to selectively rotate the drive 518.

The rotary grill further includes at least one skewer 524, which is rotatably disposed within the at least one kettle front holder 512FA. The skewer 524 may be conventional, including a skewer handle 524A connected to a skewer tine 524C and having a skewer bushing 524B positioned thereon adjacent to the skewer handle 524A. A skewer gear 524D is securely positioned on the skewer tine 524C over the at least one drive gear 518C (shown in FIG. 8), engaging therewith.

The rotary grill 500 further has a rotisserie 516, which includes a rotisserie shaft 516B having a rotisserie sprocket 516A securely mounted at a distal end. The rotisserie shaft 516B further has a rotisserie tine 516C mounted thereon. The rotisserie sprocket 516A is in communication with the drive sprocket 518A by a chain 520. The rotisserie 516 further has a rotisserie bearing 516D positioned at a distal end of the rotisserie shaft 516B opposite the rotisserie sprocket 516A.

In FIG. 8, the rotary grill 500 is further shown having an exemplary gas burner 534 positioned within the kettle. The gas burner 534 is controlled by suitable control knobs or the like, as is conventionally known. As noted above, the drive 518 includes drive shaft 518B, which is securely attached to at least one drive gear 518C positioned thereon. As further shown in FIG. 7, the skewer 524 is rotatably positioned within the at least one kettle front holder 512FA. The skewer gear 524D is securely positioned on the skewer tine 524C over the at least one drive gear 518C, engaging therewith. Additionally, at least one skewer support 524E is positioned under the at least one kettle front holder 512FA. FIG. 8 further illustrates a brick tray 536 having a plurality of ceramic bricks thereon.

Such rotary grills are known in the art. Examples of such grills are shown in U.S. Pat. Nos. 6,439,109 and 6,658,991, each of which is herein incorporated by reference in its entirety. Such grills, rotisseries and the like are very limited in the types of food that can be cooked. The simple skewers used in such systems limit the food articles to be grilled to relatively thick cuts of meat or vegetables, and are not adapted to thin or more delicate food items that cannot be easily skewered.

Thus, a food retainer for a rotary grill solving the aforementioned problems is desired.

SUMMARY OF THE INVENTION

The food retainer for a rotary grill allows a wide variety of differing food articles to be grilled with a rotary grill, a rotisserie or the like. A first embodiment of the food retainer includes an elongated, substantially rectangular mesh cage having opposed, substantially rectangular mesh faces joined by mesh edge walls on three sides (including the two short end edges and one of the two elongated side edges) that define the thickness or height of the holder, the fourth side being open to permit insertion of food into the cage. A pair of shafts extend outward from the end edges, the shafts being adapted for supporting and selectively rotating the mesh cage in the rotary grill. This embodiment is particular well suited for grilling relatively flat pieces of food, such as steaks, chops, chicken and fish filets, meat patties, etc., which may be wedged between or form a friction fit between the opposing rectangular faces so that the food does not slide out of the open side when the cage is rotated during cooking.

In an alternative embodiment, the food retainer includes a base formed from a thermally conductive metal and at least one strap extending across an upper surface thereof. The strap is adapted for releasably securing an article of food against the upper surface of the base. Further, a pair of shafts extend from opposite sides of the base, the shafts being adapted for supporting and selectively rotating the base in the rotary grill.

In a further alternative embodiment, the food retainer includes a mesh cage having an inner cylindrical mesh wall, an outer cylindrical mesh wall positioned coaxially with respect to the inner cylindrical wall, a side or end mesh wall and an axially opposed open end, the cage defining a cylindrical shell or elongated torus. The inner and outer cylindrical mesh walls are spaced apart from one another so that an article of food may be received and securely held therebetween. A central shaft extends axially through the cylindrical cage, the inner cylindrical mesh wall being secured thereto. Axially opposed ends of the central shaft are adapted for supporting and selectively rotating the mesh cage in the rotary grill.

In yet another alternative embodiment, the food retainer includes a pair of circular end members, which could be disks or wire circles, and a plurality of skewers or spits extending between the circular end members. The skewers are selectively mounted in loops or eyelets welded or otherwise attached to the circular members and extending outward from the circumference of the circular members. The plurality of skewers are each adapted for receiving and securely holding at least one article of food. A central shaft extends through the circular members and is adapted for supporting and selectively rotating the assembly in a grill or rotisserie.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
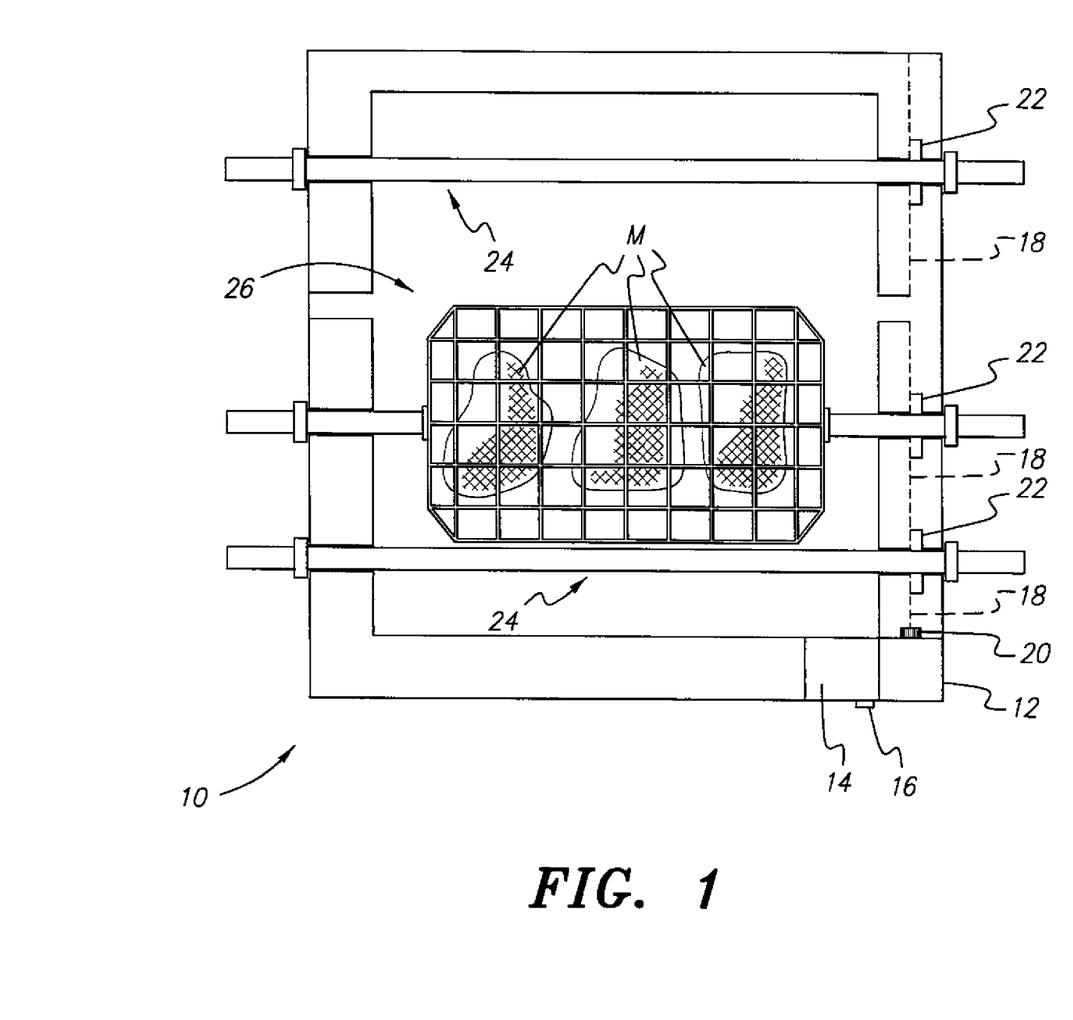
FIG. 1 is an environmental top view of a first embodiment of a food retainer for a rotary grill according to the present invention, shown supported above the bed of a grill.
Figure 2:
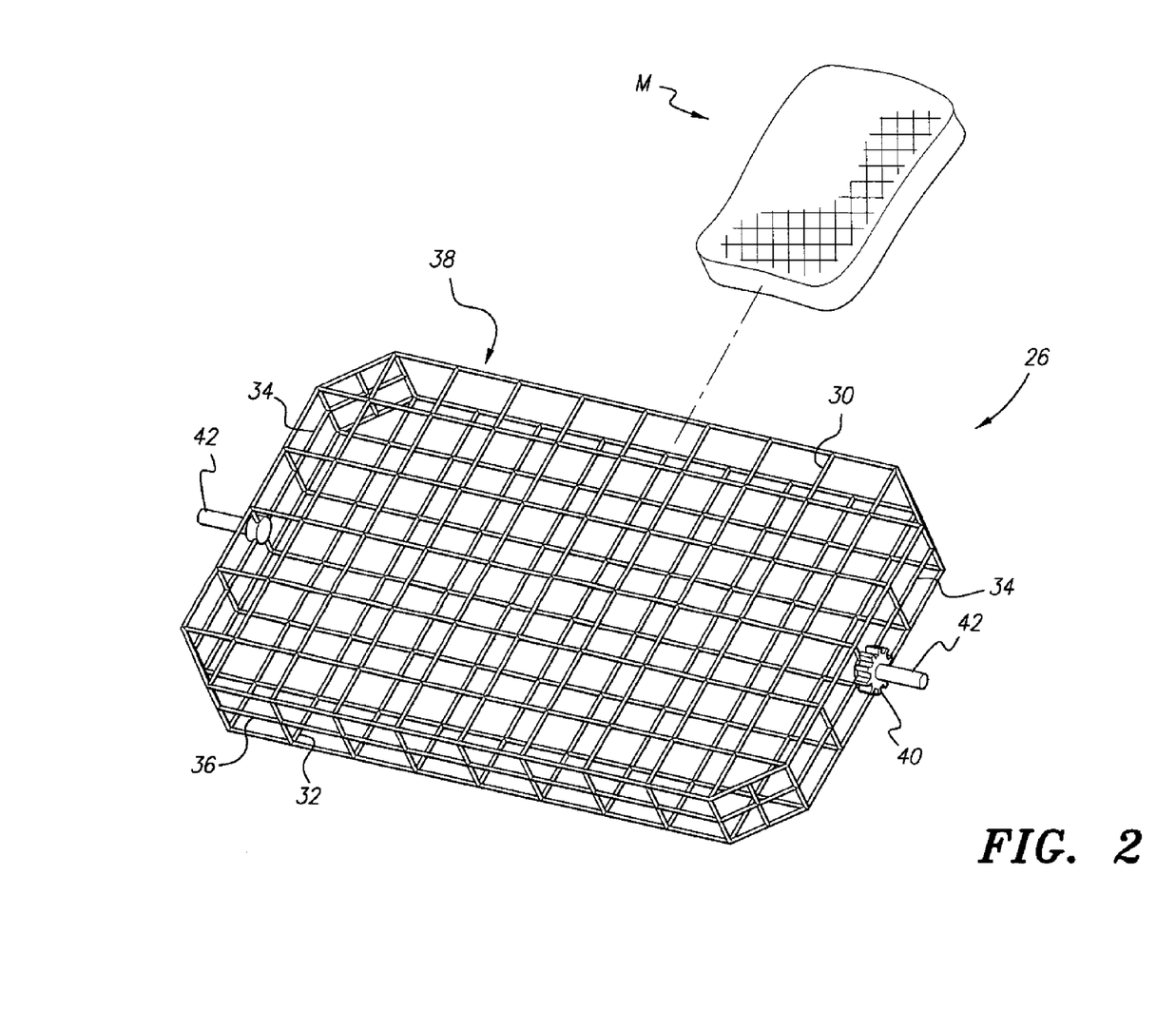
FIG. 2 is a perspective view of the food retainer of FIG. 1.

FIGS. 1 and 2 illustrate a first embodiment of the food retainer 26. In FIG. 1, the food retainer 26 is shown in use with an exemplary rotary grill 10, similar in design to the prior art grill described above with respect to FIGS. 7 and 8. It should be understood that food retainer 26 may be used in combination with any suitable type of rotary grill, rotisserie or the like. The exemplary grill 10 includes a kettle-type housing, which may be adapted for electric, wood or charcoal grilling. The rotary grill 10 further includes a drive having a drive shaft 18 and a drive sprocket 20 securely attached at a distal end thereof. The rotary grill 10 further includes a motor 12, which is connected to the drive shaft 18 to selectively rotate the drive. The motor 12 is in communication with a controller 14, including at least one control knob 16 or the like, as is conventionally known, allowing the user to program cooking time based upon cooking preferences, such as well done, medium or rare. The controller 14 preferably includes an automatic shut-off feature and an alarm. The controller 14 controls both cooking time as well as the speed of rotation of the food retainer 26.

The food retainer 26 will be described in detail below, particularly with regard to FIG. 2. FIG. 1 illustrates the food retainer 26 and a pair of conventional skewers 24 rotatably positioned within and extending across the housing 11. The food retainer 26 and each skewer include a gear 40 (best shown in FIG. 2), as will be described in greater detail below, for engaging a drive gear 22 (similar to gear 518C of prior art system 500).

As best shown in FIG. 2, the food retainer 26 includes an elongated, substantially rectangular mesh cage having opposed, substantially rectangular mesh faces 30, 32 joined by mesh edge walls 34, 36 on three sides (including the two short end edges and one of the two elongated side edges) that define the thickness or height of the holder, the fourth side 38 being open to permit insertion of food into the cage. A pair of shafts 42 extend outward from the end edges 34, the shafts 42 being adapted for supporting and selectively rotating the mesh cage in the rotary grill. This embodiment is particular well suited for grilling relatively flat pieces of food, such as steaks, chops, chicken and fish filets, meat patties, etc., which may be wedged between or form a friction fit between the opposing rectangular faces so that the food does not slide out of the open side when the cage is rotated during cooking. The mesh cage is preferably formed from a thermally conductive metal, the entire cage being formed from a washable metal wire mesh. The term "mesh cage" or "wire mesh", as used herein, may refer to a thin gauge wire woven or formed into a mash, or to stiff or rigid wire rods of the type used to form cooking racks for grills and ovens that are joined together to form a larger gauge grid, or in some embodiments, to expanded metal.

At least one gear 40 is mounted on at least one of shafts 42, as described above, for engaging with the drive gear 22 of the rotary grill.

It should be understood that any suitable type of drive system may be used for selective rotation of food retainer 26 within grill 10. For example, a manual spit-type rotary handle may be coupled with food retainer 26, as opposed to the automatic grilling system described above. A chain and sprocket drive mechanism may be used in lieu of gears.

Figure 3:
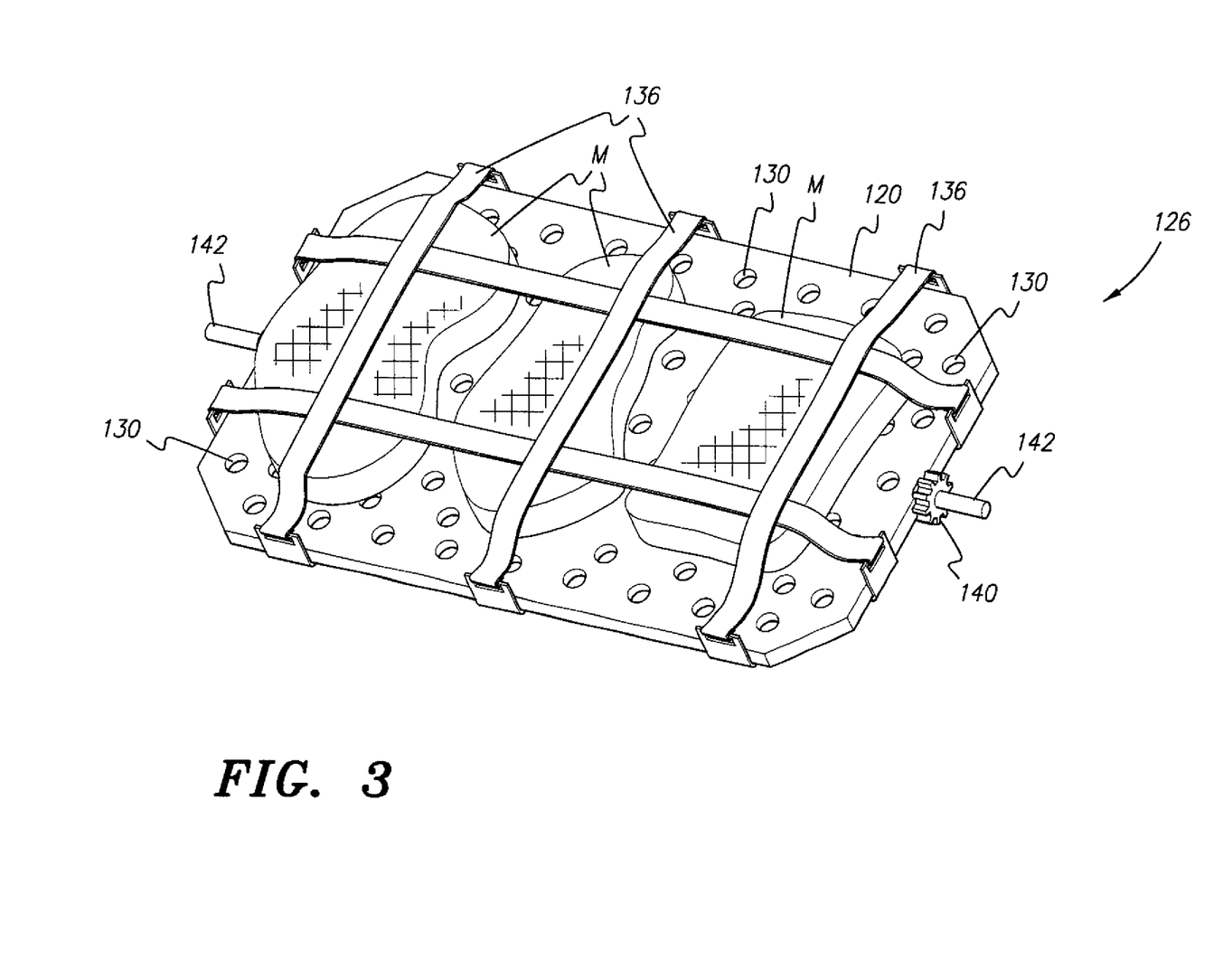
FIG. 3 is a perspective view of a second embodiment of a food retainer for a rotary grill according to the present invention.

In the alternative embodiment of FIG. 3, the food retainer 126 includes a base 120 formed from a thermally conductive metal and at least one strap 136 extending across an upper surface thereof. Although the base 120 is shown as being substantially rectangular, it should be understood that the base 120 may have any desired shape or relative dimensions. Additionally, at least one perforation or aperture 130 is preferably formed through the base 120. The strap(s) 136 is (are) preferably formed from a flame and heat-resistant material, such as metal wire or the like, and the strap(s) 136 is (are) adapted for releasably securing an article of food (such as exemplary meat M) against the upper surface of the base 120.

As shown, the at least one strap 136 preferably includes a plurality of straps, the straps 136 extending both longitudinally and laterally across the upper surface of base 120 to securely hold meat M to the upper surface thereof.

Further, a pair of longitudinally extending shafts 142 extend from longitudinally opposed side edges of the base 120. The shafts 142 are adapted for supporting and selectively rotating the base 120 in the rotary grill. Preferably, at least one gear 140 is mounted on at least one of shafts 142 for engaging with the drive gear 22 of the rotary grill.

Figure 5:
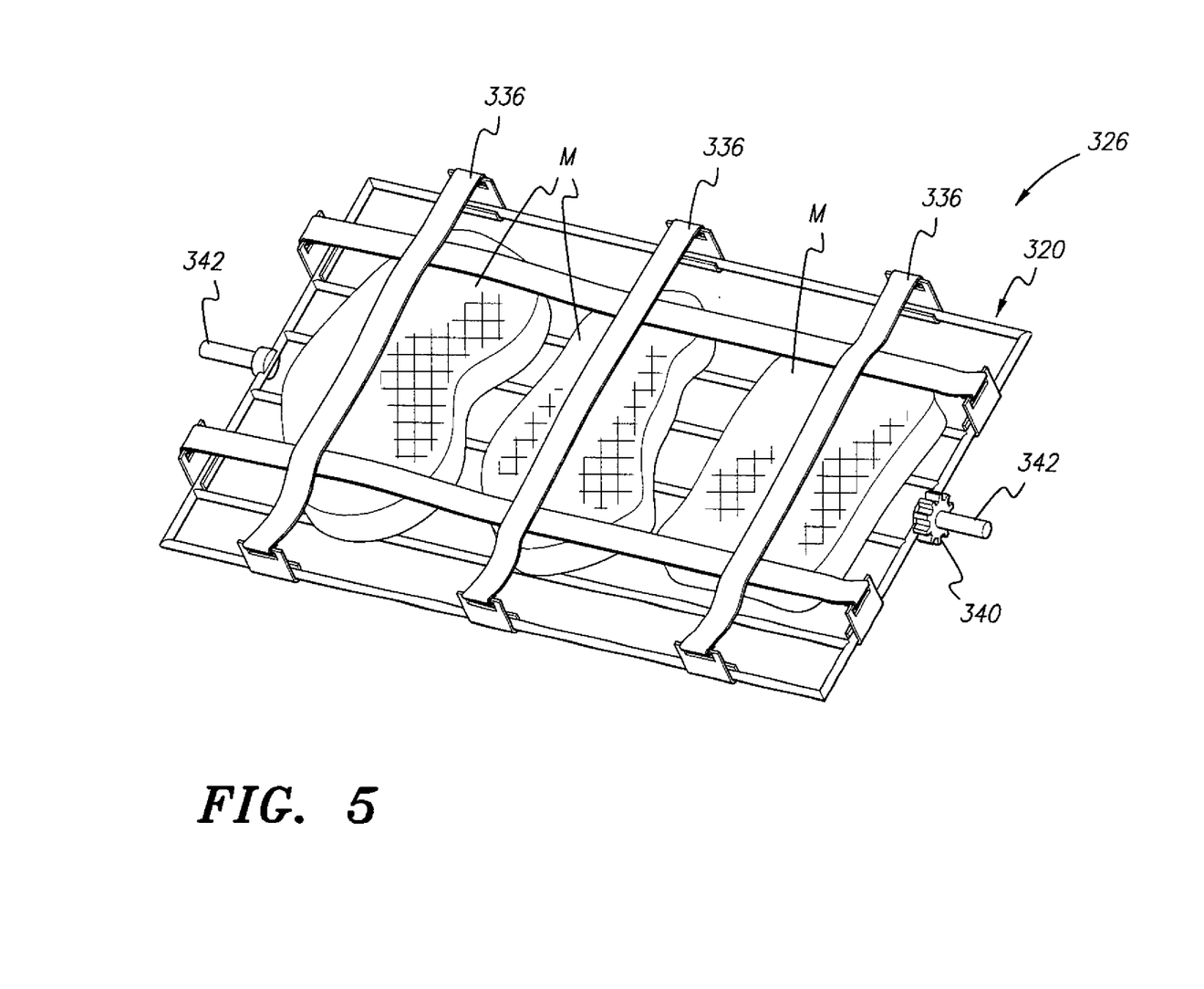
FIG. 5 is a perspective view of a fourth embodiment of a food retainer for a rotary grill according to the present invention.

The embodiment of FIG. 5 is similar to the food retainer 126 of FIG. 3, but the food retainer 326 of FIG. 5 includes a base 320 that is formed as a wire rack, similar to a conventional metal wire rack used in grills, ovens and the like, rather than the perforated plate 120 of FIG. 3. At least one strap 336 extends across an upper surface of the base 320. Although the base 320 is shown as being substantially rectangular, it should be understood that base 320 may have any desired shape or relative dimensions. As in the previous embodiment, the strap(s) 336 is (are) preferably formed from a flame and heat-resistant material, such as metal wire or the like, and the strap(s) 336 is (are) adapted for releasably securing an article of food (such as exemplary meat M) against the upper surface of the base 320.

The at least one strap 336 preferably includes a plurality of straps, the straps 336 extending both longitudinally and laterally across the upper surface of the base 320 to securely hold meat M to the upper surface thereof.

Further, a pair of shafts 342 extend from opposed side edges of the base 320. The shafts 342 are adapted for supporting and selectively rotating the base 320 in the rotary grill 10. Preferably, at least one gear 340 is mounted on at least one of shafts 342 for engaging with the drive gear 22 of the rotary grill 10.

Figure 4:
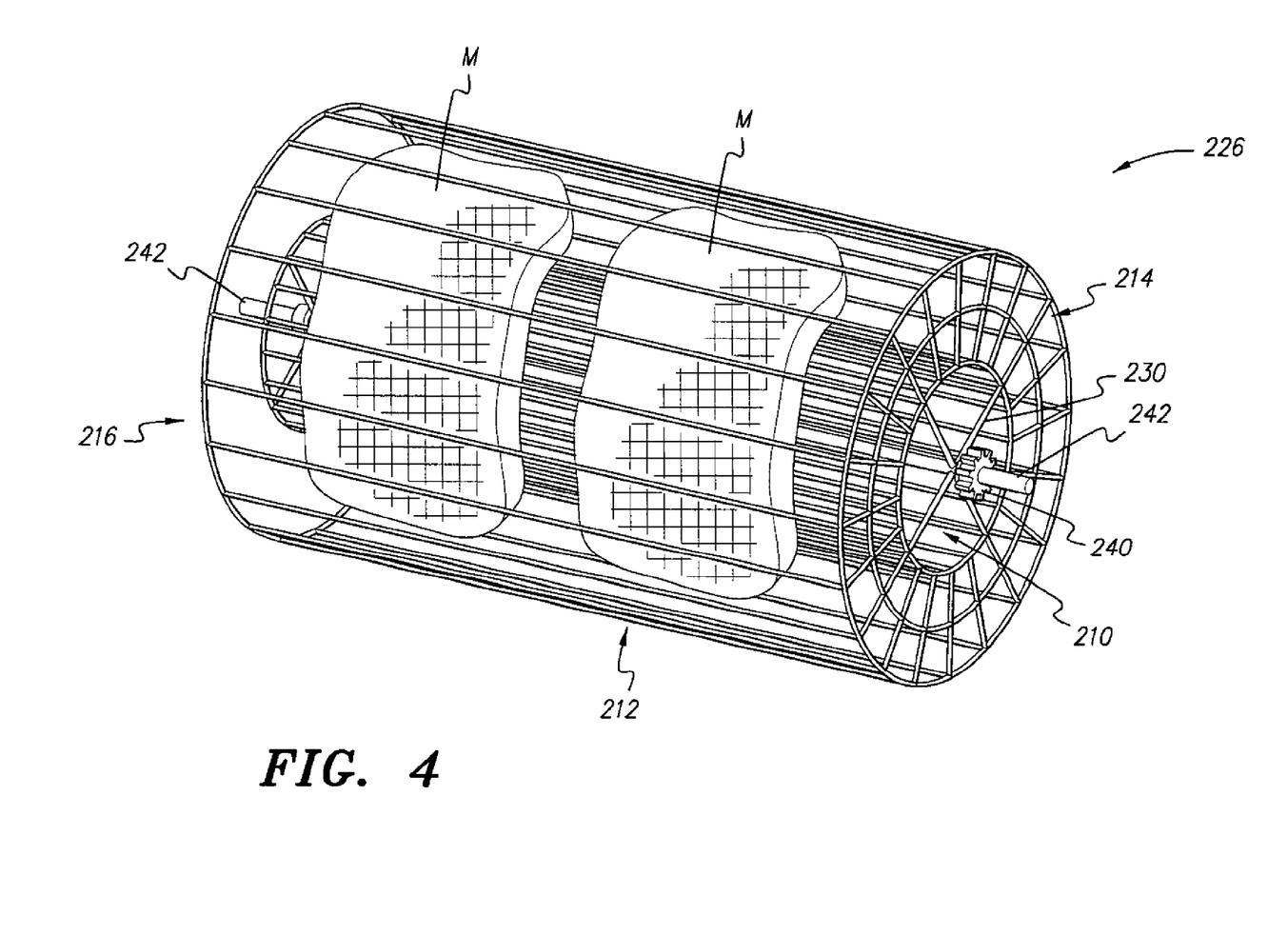
FIG. 4 is a perspective view of a third embodiment of a food retainer for a rotary grill according to the present invention.

In the further alternative embodiment of FIG. 4, the food retainer 226 includes a mesh cage having an inner cylindrical mesh wall 210, an outer cylindrical mesh wall 212 positioned coaxially with respect to the inner cylindrical wall 210, a side mesh wall 214 and an axially opposed open end 216, the cage defining a cylindrical shell or elongated torus. The inner and outer cylindrical mesh walls 210, 212 are spaced apart from one another so that an article of food (such as exemplary piece of meat M) may be received and securely held therebetween.

The mesh cage is preferably formed from a thermally conductive metal, the entire cage being formed from metal wire mesh. Preferably, the inner and outer cylindrical mesh walls 210, 212 are relatively thinly spaced apart (i.e., the radial distance therebetween is relatively small) so that a single piece of meat M, for example, will contact both walls 210, 212 and be securely held therebetween during cooking.

Additionally, a central shaft 242 is attached to the inner cylindrical mesh wall 210 by a plurality of spokes 230. The axially opposed ends of the central shaft 242 are adapted for supporting and selectively rotating the mesh cage in the rotary grill 10. Preferably, at least one gear 240 is mounted on at least one end of the shaft 242 for engaging with the drive gear 22 of the rotary grill 10.

Figure 6:
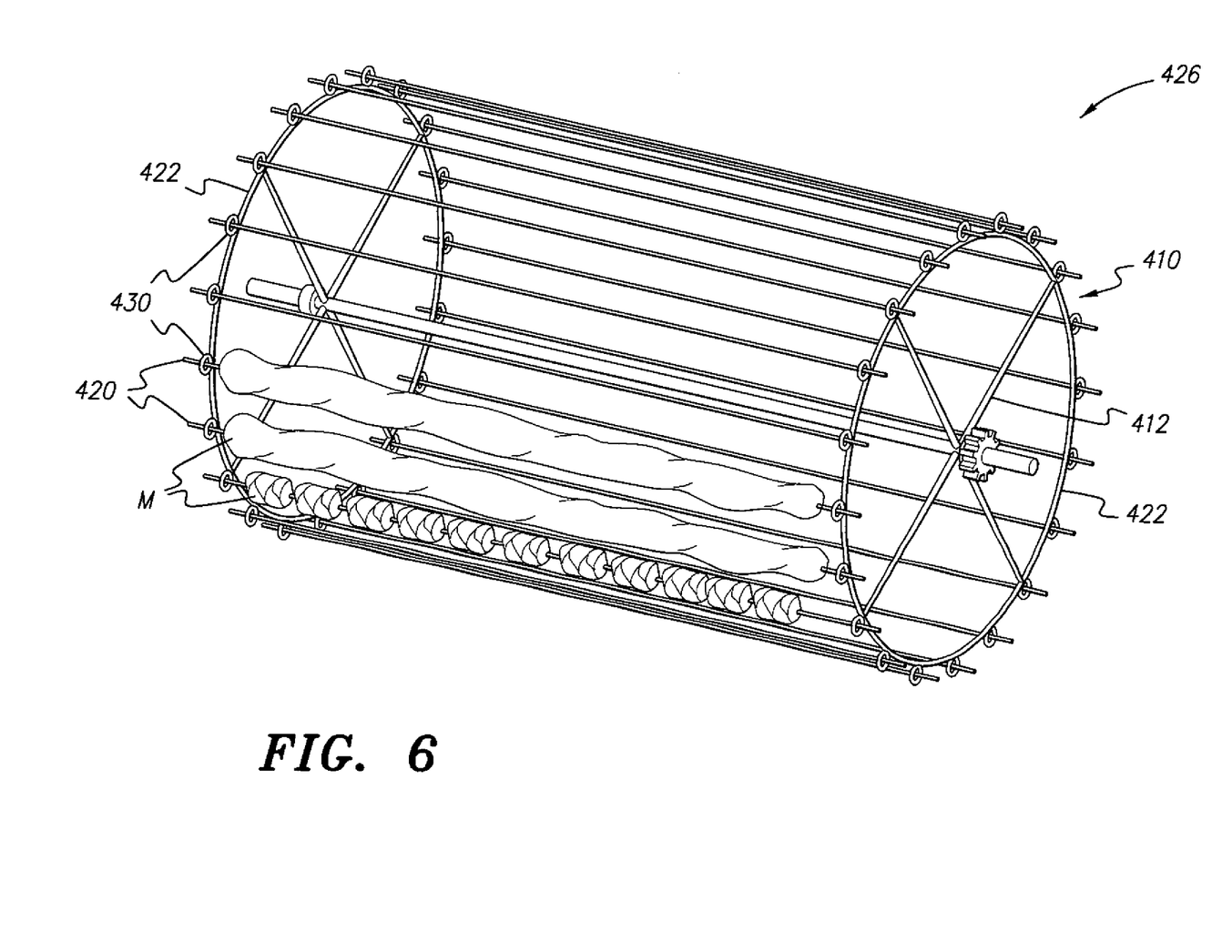
FIG. 6 is a perspective view of a fifth embodiment of a food retainer for a rotary grill according to the present invention.

In the alternative embodiment of FIG. 6, the food retainer 426 has a pair of axially opposed circular frame members 422 and a plurality of axially extending spits or skewers 420 removably mounted thereon and extending therebetween. The skewers 420 are preferably conventional cooking skewers. The circular frame members 422 may be plate disks, or a wire circle supported by radially extending spokes. The circular frame members 422 have a plurality of radially spaced loops or eyelets 430 extending outward from their circumference, the spits or skewers 420 being selectively mounted in the eyelets 430 to maintain adequate spacing between the articles of food disposed on the skewers 420. Mounting the skewers outside the circumference of the circular frame members 422 maintains proper exposure to heat, maintains proper air circulation, and minimizes fouling of the retainer 426 by drippings from fats or sauces.

The skewers 420 are each adapted for receiving and securely holding at least one article of food, as is conventionally known. A central shaft 442 extends through the circular frame members 422, being secured thereto by a plurality of radially extending spokes 412 in the case of a wire circle, or by collars, sleeves, or bushings when the circular frame members are plate disks. The central shaft 442 is adapted for supporting and selectively rotating the mesh cage in the rotary grill 10. Preferably, at least one gear 440 is mounted on at least one end of the shaft 442 for engaging the drive gear 22 of the rotary grill 10.

It is to be understood that the present invention is not limited to the embodiments described above, but encompasses any and all embodiments within the scope of the following claims.

We claim:

1. A food retainer for a rotary grill, comprising:
   a base formed from a thermally conductive metal, the base having an upper surface;
   a plurality of straps extending across an upper surface of the base for releasably securing an article of food against the upper surface of said base, wherein said plurality of straps includes at least one longitudinally extending strap extending along an entire longitudinal length of the upper surface of the base and being releasably secured at either end thereof to a pair of longitudinally-opposed edges of said base, and at least one laterally extending strap extending along an entire lateral length of the upper surface of the base and being releasably secured at either end thereof to a pair of laterally-opposed edges of said base; and
   a pair of longitudinally extending shafts extending from opposed side edges of the base, at least one of the shafts includes a gear mounted thereon whereby the shafts are adapted for supporting and selectively rotating the base in a rotary grill.

2. The food retainer for a rotary grill as recited in claim 1, wherein said base is substantially rectangular.

3. The food retainer for a rotary grill as recited in claim 2, wherein said base comprises a perforated plate having a plurality of apertures defined therein.

4. The food retainer for a rotary grill as recited in claim 2, wherein said base comprises a wire rack.

5. A food retainer for a rotary grill, comprising:
   a pair of frame members, the frame members consisting of open, continuous, ring-shaped circular frame members defining a circular circumference;
   a plurality of radially spaced eyelets extending outward from the circumference of each of the open, ring-shaped circular frame members;
   a plurality of skewers adapted for receiving and securely holding at least one article of food on each of the skewers, the skewers being selectively inserted through the eyelets and extending between the pair of open, ring-shaped circular frame members to support the articles of food between the circular frame members; and
   an axially extending central shaft extending through the open, ring-shaped circular frame members, a plurality of radially extending spokes joining the central shaft to each of the circular frame members, the central shaft having axially opposed ends extending beyond the spokes and the open, ring-shaped circular frame members, at least one of the opposed ends includes a gear mounted thereon whereby the opposed ends are adapted for supporting and selectively rotating the open, ring-shaped circular frame members in a rotary grill.

\* \* \* \* \*